(12) United States Patent
Krufka et al.

(10) Patent No.: US 10,737,228 B2
(45) Date of Patent: Aug. 11, 2020

(54) PHASE-MODULATED STANDING WAVE MIXING APPARATUS AND METHODS

(71) Applicant: Siemens Healthcare Diagnostics Inc., Tarrytown, NY (US)

(72) Inventors: Stephen Krufka, Newark, DE (US); Antoine Haddad, Newark, DE (US); Jeffrey Taylor, Lincoln University, PA (US)

(73) Assignee: Siemens Healthcare Diagnostics Inc, Tarrytown, NY (US)

( * ) Notice: Subject to any disclaimer, the term of this patent is extended or adjusted under 35 U.S.C. 154(b) by 676 days.

(21) Appl. No.: 15/511,578

(22) PCT Filed: Sep. 16, 2015

(86) PCT No.: PCT/US2015/050492
§ 371 (c)(1),
(2) Date: Mar. 15, 2017

(87) PCT Pub. No.: WO2016/048760
PCT Pub. Date: Mar. 31, 2016

(65) Prior Publication Data
US 2017/0246601 A1 Aug. 31, 2017

Related U.S. Application Data

(60) Provisional application No. 62/056,194, filed on Sep. 26, 2014.

(51) Int. Cl.
*G01N 35/10* (2006.01)
*B01F 11/02* (2006.01)
(Continued)

(52) U.S. Cl.
CPC ... *B01F 11/0283* (2013.01); *B01F 2215/0454* (2013.01); *G01N 35/025* (2013.01);
(Continued)

(58) Field of Classification Search
CPC ......... B01F 11/0283; B01F 2215/0454; G01N 2035/00554; G01N 35/10; G01N 35/026; G01N 35/025
(Continued)

(56) References Cited

U.S. PATENT DOCUMENTS 2,650,872 A * 9/1953 Goldwasser ............ D06F 19/00
8/159
4,930,532 A * 6/1990 Mayer ................... A61C 19/002
134/117
(Continued)

FOREIGN PATENT DOCUMENTS

CN 101175557 A 5/2008
CN 101946181 A 1/2011
(Continued)

OTHER PUBLICATIONS

Extended EP Search Report dated Oct. 2, 2017 of corresponding European Application No. 15844882.9, 5 Pages.
(Continued)

*Primary Examiner* — Huy Tram Nguyen

(57) ABSTRACT

Disclosed are mixing apparatus adapted to provide mixing of components in an automated analyzer. The mixing apparatus includes a reservoir configured to contain a coupling liquid, a transducer configured to be driven at a frequency and communicate with the coupling liquid, and a signal generation unit configured to provide a phase modulatable drive signal to the transducer. In some embodiments, improved patient sample and reagent mixing may be provided. Systems and methods are provided, as are other aspects.

20 Claims, 7 Drawing Sheets

(51) Int. Cl.
*G01N 35/02* (2006.01)
*G01N 35/00* (2006.01)

(52) U.S. Cl.
CPC ........... *G01N 35/026* (2013.01); *G01N 35/10* (2013.01); *G01N 2035/00554* (2013.01)

(58) Field of Classification Search
USPC ........................................................ 366/127
See application file for complete search history.

(56) References Cited

U.S. PATENT DOCUMENTS

| | | | |
|---|---|---|---|
| 5,736,100 A * | 4/1998 | Miyake | B01F 11/0283 366/127 |
| 8,263,005 B2 * | 9/2012 | Laugharn, Jr. | B01F 11/02 366/127 |
| 2004/0069535 A1 | 4/2004 | Hahn et al. | |
| 2004/0090909 A1 | 5/2004 | Khlat | |
| 2006/0152998 A1 | 7/2006 | Burr et al. | |
| 2007/0267351 A1 | 11/2007 | Roach et al. | |
| 2008/0308404 A1 | 12/2008 | Luotola et al. | |
| 2009/0052272 A1 | 2/2009 | Sarvazyan | |

FOREIGN PATENT DOCUMENTS

| | | |
|---|---|---|
| EP | 2 275 823 A1 | 1/2011 |
| JP | 2003-254979 A | 9/2003 |
| JP | 2007-078618 A | 3/2007 |
| JP | 2008-256565 A | 10/2008 |
| JP | 2008-541069 A | 11/2008 |
| JP | 2009-031069 A | 2/2009 |
| JP | 2009-270941 A | 11/2009 |
| WO | 02/082053 A2 | 10/2002 |
| WO | 2009/014261 A1 | 1/2009 |
| WO | 2009/144209 A1 | 12/2009 |

OTHER PUBLICATIONS

PCT International Search Report and Written Opinion dated Dec. 17, 2015 (9 Pages).

* cited by examiner

PHASE-MODULATED STANDING WAVE MIXING APPARATUS AND METHODS

RELATED APPLICATION

This application claims priority to U.S. Provisional Application Ser. No. 62/056,194 entitled "PHASE-MODULATED STANDING WAVE MIXING APPARATUS AND METHODS" filed on Sep. 26, 2014, the disclosure of which is hereby incorporated by reference in its entirety herein.

FIELD

The present invention relates generally to methods and systems adapted to mix various components, such as liquids or combinations of liquid and solid.

BACKGROUND

In the implementation of automated clinical chemistry testing methods, a liquid sample (e.g., patient sample) and a reagent, and possibly other process fluids are combined. Conventionally, a liquid sample (e.g., patient sample), one or more process fluids (e.g., purified water), and reagents are aspirated and dispensed within an automated clinical analyzer, such as by using a probe (otherwise referred to as a pipette) into a reaction vessel (e.g., a cuvette). In certain clinical analyzer instruments used to test for the presence of an analyte or other component in a patient sample it may be desirable to mix the patient sample and the reagent. Once mixed, various additional processing steps take place within the automated clinical analyzer to isolate and quantity the analyte (e.g., nucleic acid) of interest. During these processing steps additional mixing operations may be involved. As part of this process, rapid and thorough mixing in order to provide a homogeneous mixture is sought.

Conventional mixing methods include ultrasonic mixing wherein the frequency of an ultrasonic member is modulated. However, although such methods may result in adequate mixing, they may result in complex and expensive systems.

Accordingly, methods and systems that may improve component mixing are desired.

SUMMARY

According to a first aspect, a mixing apparatus is provided. The mixing apparatus includes a reservoir configured to contain a coupling liquid, a transducer configured to be driven at a frequency and communicate with the coupling liquid, and a signal generation unit configured to provide a phase modulatable drive signal to the transducer.

According to another aspect, a method of mixing components is provided. The method includes providing a reaction vessel including components to be mixed, providing a drive signal to a transducer to produce vibrations at a desired frequency resulting in standing waves in the reaction vessel, and phase modulating the drive signal to move the standing waves and promote mixing of the components.

In another aspect, an analyzer apparatus is provided. The analyzer apparatus includes an annular reservoir configured to contain a coupling liquid, an transducer configured to be driven at a frequency and communicate with the coupling liquid, a carrier member configured to suspend reaction vessels containing components to be mixed in the coupling liquid, and a signal generation unit configured to provide a phase modulatable drive signal to the transducer to produce moving standing waves in the components to be mixed in at least one of the suspend reaction vessels.

Still other aspects, features, and advantages of the present invention may be readily apparent from the following detailed description by illustrating a number of example embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The drawings are not necessarily drawn to scale. The invention is to cover all modifications, equivalents, and alternatives falling within the scope of the invention.

DESCRIPTION

For at least the above-described reasons, achieving improved mixing of components, especially of one or more reagents and a patient sample in clinical analyte testing or analysis is desirable. The inventors herein have discovered a simple, yet effective, way of generating standing waves within a reaction vessel (e.g., cuvette) containing the components to be mixed, and then moving (e.g., oscillating) the standing waves back and forth within a reaction vessel, in order to thoroughly mix the components.

The improved mixing is accomplished according to embodiments of the invention by setting up standing waves (e.g., vertically-oriented standing waves) in the reaction vessel by driving a high-frequency transducer fluidly coupled to the reaction vessel, such as by a coupling liquid. The drive signal to the transducer is phase modulatable to move the locations of the standing waves back and forth laterally within the reaction vessel in order to accomplish mixing.

These and other aspects and features of the invention will be described with reference to FIGS. 1-5 herein.

Figure 1:
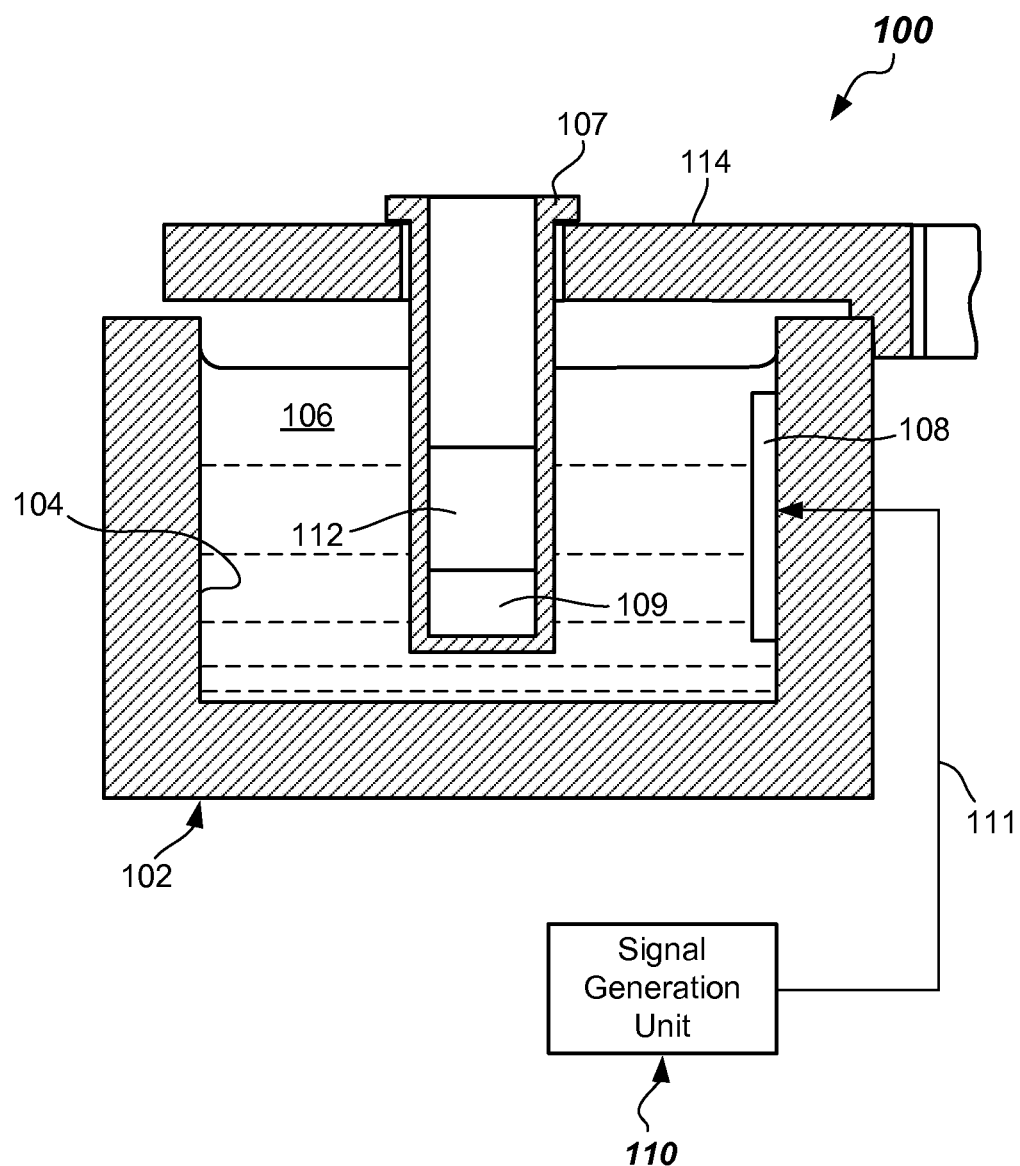
FIG. 1 illustrates a partial cross-sectioned side view of a mixing apparatus according to embodiments.

As represented in FIG. 1, a structural configuration of a sonic mixing apparatus 100 (hereinafter "mixing apparatus") in accordance with one or more embodiments of the present invention is shown. The mixing apparatus 100 includes a container 102 including a reservoir 104 formed of container walls (e.g., inner and outer container walls and a floor) that is configured to receive and contain a coupling liquid 106. In one or more embodiment, the reservoir 104 may have an annular shape and may have an annular recess formed therein that may include an open top. Coupling liquid 106 may be any suitable liquid that functions to aid in the transmission of vibrations (e.g., pressure waves) to the reaction vessel 107 which is suspended in the coupling liquid 106 contained within the reservoir 104. Coupling liquid 106 may be a liquid such as water, but may also be a gel (e.g., an ultrasound gel).

Mixing apparatus 100 further includes a transducer 108. The transducer 108 is configured to be driven at high frequency to produce a wave or other disturbance that communicates with the coupling liquid 106. The transducer 108 may be driven at approximately a resonant frequency of the transducer 108 in some embodiments. "Communicate" as used herein means causing or producing pressure waves in the coupling liquid 106. In one or more embodiments, the transducer 108 may be immersed in the coupling liquid 106 and may include one or more surfaces that act directly upon the coupling liquid 106. In some embodiments, the transducer 108 may be coupled to a container side wall of the reservoir 104 of the container 102. Transducer 108 may be a piezoelectric transducer in some embodiments. For example, a lead, zirconate and titanate piezoelectric (PZT) ceramic material may be used for the transducer 108. One or more piezoelectric material (e.g., crystal elements) may be used. The transducer 108 may have an effective driving area of any suitable shape (e.g., circular, rectangular, square, or the like) that is large enough to set up standing waves in the entire volume of the component to be mixed that is held by the reaction vessel 107. Effective driving area may be between about 50 mm$^2$ and about 1000 mm$^2$, or about 175 mm$^2$ for a 7 mm×7 mm×15 mm volume of components to be mixed in some embodiments. Other types and driving areas of suitable high-frequency transducers may be used. Transducer 108 may, in one or more embodiments, be driven at a substantially constant frequency. The drive frequency (ω) may be dependent on the number of standing waves that are desired to be generated in the reaction vessel 107. For example, the transducer 108 may be driven at about 200 KHz or more, greater than about 500 KHz or more, greater than about 1 MHz or more, or even greater than about 1.5 MHz or more. In some embodiments, the transducer 108 may be driven at between about 200 KHz and about 4 MHz, between about 1 MHz and about 3 MHz, or even between about 1.3 MHz and 2.6 MHz, for example. In one example, 16 vertically-oriented standing waves may be generated in a reaction vessel having a 7 mm width, when driven at about 1.72 MHz.

In more detail, mixing apparatus 100 further includes a signal generation unit 110 that is configured to produce a phase modulatable drive signal to the transducer 108 in line 111. Signal generation unit 110 may be configured to be driven at approximately a resonant frequency of the transducer 108. Signal generation unit 110 is operational to produce a drive signal in line 111 to drive the transducer 108 that is phase modulatable. The term "phase modulatable" as used herein means that the drive signal may be actively varied in phase. The signal generation unit 110 may be configured to adjust (e.g., modulate) the phase of the phase modulatable drive signal between a first phase angle and a second phase angle, over time, wherein the second phase angle is different than the first phase angle. Signal generation unit 110 may be configured to adjust the phase of the phase modulatable drive signal between about 0 degrees and about 180 degrees in some embodiments. Large variations in phase over time were discovered by the inventors to provide rapid mixing of components, given that the standings waves move back in forth in direct correlation to the magnitude of any phase change. For example, a phase angle change of 180 degrees may cause the standing wave to move back and forth by one half of the wavelength of the wave causing the standing wave. Producing the moving standing waves promotes some mixing of the first and second components (e.g., patient sample 109 and reagent 112). Variation between other phase angles, other than 0 and 180, may be used.

Figure 2:
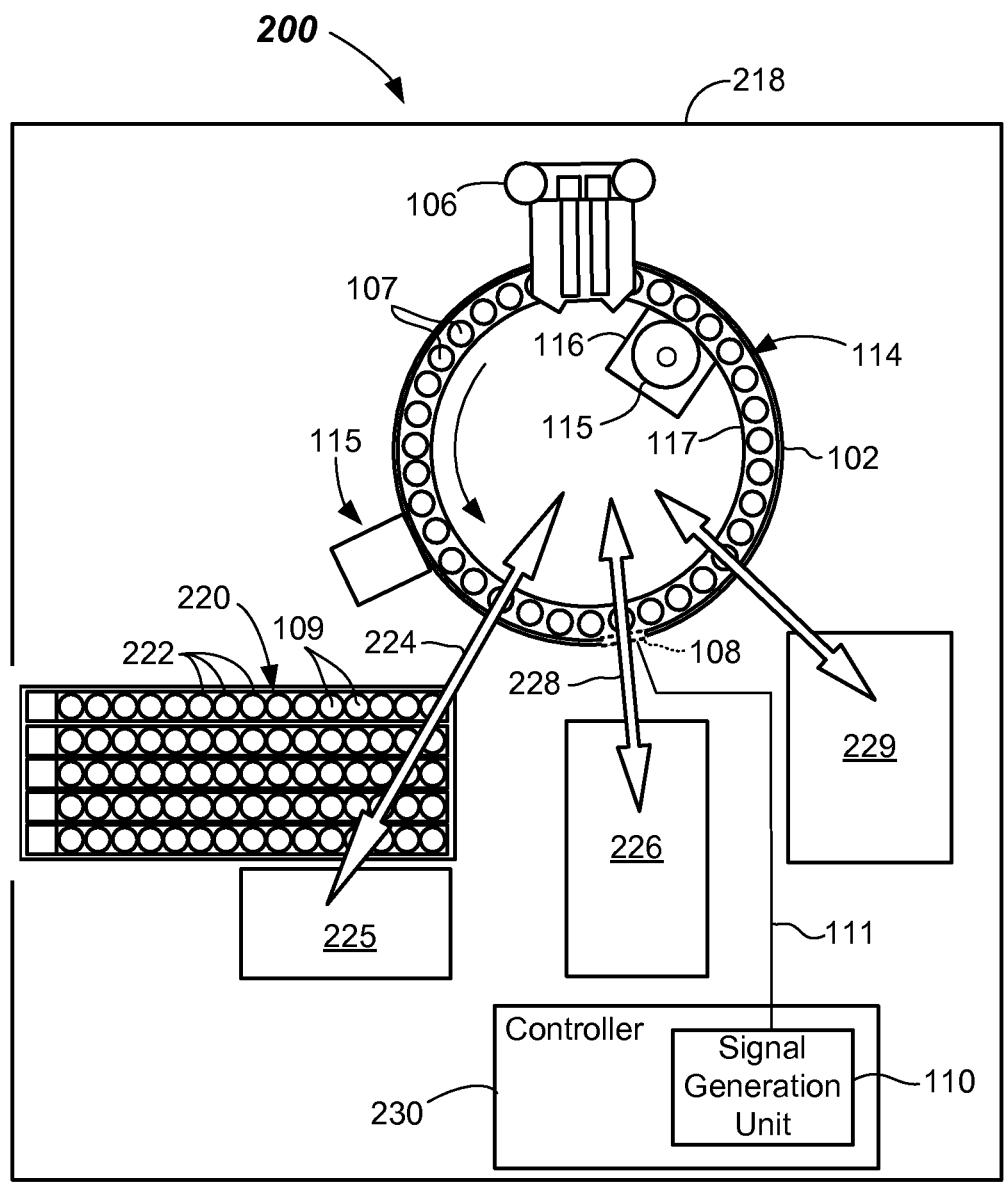
FIG. 2 illustrates a top view of an aspiration and dispensing apparatus including a mixing apparatus according to embodiments.

As shown in FIGS. 1 and 2, the reaction vessels 107 may be received in a carrier member 114. For example, the reaction vessels 107 may be received in apertures formed therein. Carrier member 114 may be contain a number of reaction vessels 107, which may be identical and may be arranged in a circle, such as shown in FIG. 2. Carrier member 114 may be rotated by a drive member 115, which may be engaged with the carrier member 114 in some manner. For example, drive member 115 may be a gear that engages with gear teeth 117 formed on the radial inside surface of the carrier member 114. Other suitable known drive mechanisms may be used to rotate the carrier member 114. Rotation of the carrier member 114 may be by operation of a drive motor 116 coupled to and driving the drive member 115, such as by a motor shaft. The carrier member 114 and container 102 forming the reservoir 104 may be included within a clinical analyzer apparatus 200 as is shown in FIG. 2.

Clinical analyzer apparatus 200, as best shown in FIG. 2, may include a housing 218 that may include a frame or other support structures therein. The container 102 and the drive motor 116 may be supported relative to the housing 218. The clinical analyzer apparatus 200 may receive one or more sample racks 220 (multiple racks shown) containing sample containers 222 having patient samples 109 therein. Sample racks 220 may be received on a tray, for example. Patient samples 109 may be urine, whole blood, blood serum or plasma, swab extracts from urogenital, nasopharyngeal, buccal or eye swabs, cerebral spinal fluid, semen, stool, breast milk, saliva, sputum, cell culture, amniotic fluid, ascites, bronchial alveoli lavage (BAL), collection media, peripheral blood mononuclear cells (PBMC), buffy coat, or the like.

A robot and coupled pipette (collectively designated by first arrow 224) and aspiration/dispense system (not shown) may aspirate patient sample 109 from the sample containers 222 in the sample rack 220 and move the pipette to dispense the patient sample 109 into the reaction vessel 107 that is being carried by the carrier member 114. One by one, patient samples 109 may be dispensed to successive reaction vessels 107 that have been rotated to the patient sample dispense location in line with first arrow 224. A new pipette tip may be obtained by the pipette from a tip supply 225 for each new dispense of a different patient sample 109. Any suitable aspiration/dispensing system may be used for the aspiration and dispensing of patient samples 109 and various consumables, such as described in U.S. Pat. Nos. 5,777,221; 6,060, 320; 6,158,269; 6,250,130; 6,463,969: 7,998,751; 7,205,158. Other suitable aspiration/dispensing systems may be used.

Once the patient sample 109 is dispensed to the reaction vessel 107, the carrier member 114 may be rotated to a reagent addition location and one or more reagents 112 may be added from a reagent supply 226 by a second robot and pipette (collectively designed by second arrow 228). At the location of the reagent addition, the transducer 108 (shown dotted and enlarged in FIG. 2) may be located. The transducer 108 may be driven by the drive signal in line 111 from the signal generation unit 110, which may be part of a controller 230 for the clinical analyzer apparatus 200. Controller 230 may be responsible for coordinating the other movements of the various robots, motions of the carrier member 114, and other functions of the clinical analyzer apparatus 200. Controller 230 may include microprocessor and memory suitable for storing programming and for carrying out instructions. In some embodiments, there may be an additional reagent addition from a second reagent supply 229. Another transducer may be added at that location to mix the added reagent from the second reagent supply 229 with the components (e.g., patient sample 109 and one or more reagents 112) previously mixed by operation of the transducer 108.

Figure 4A:
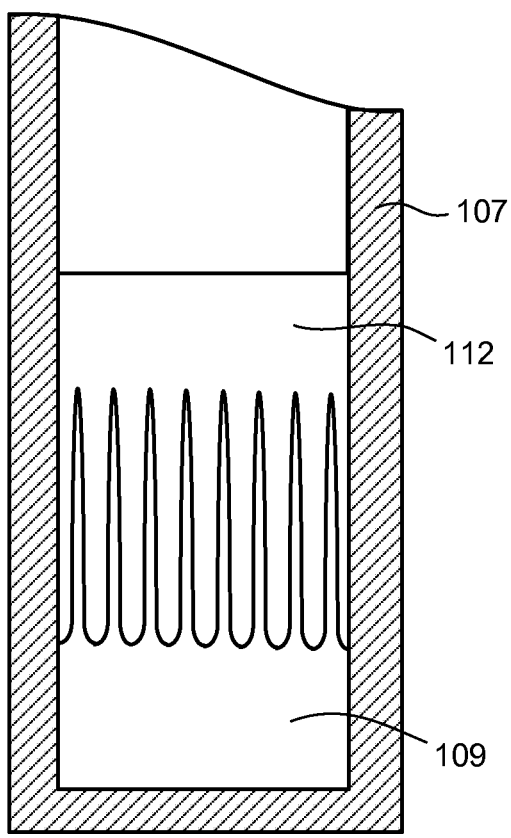
FIG. 4A illustrates a partial cross-sectional view of a reaction vessel having standing waves being initiated therein according to embodiments.
Figure 4B:
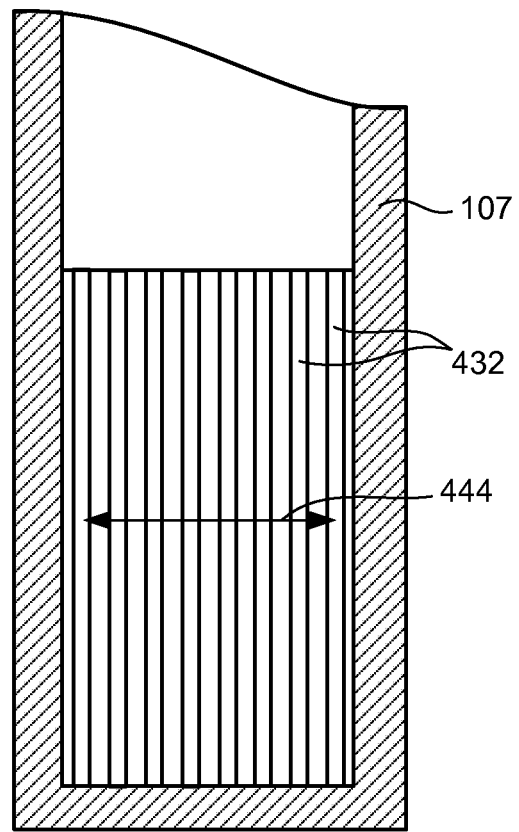
FIG. 4B illustrates a partial cross-sectional view of a reaction vessel having standing waves produced therein according to embodiments.

Driving the transducer 108 may operate to produce vibrations in the coupling liquid 106 that set up standing waves within the reaction vessel 107, as is shown in FIG. 4B. FIG. 4A illustrates the patient sample 109 being drawn up into the reagent 112 as the transducer 108 is vibrated at the operating frequency ($\omega$), with phase being held constant. Obviously, some mixing may have already occurred as the reagent 112 is added by the second robot and pipette (designated by second arrow 228), so the patterns shown are only illustrative of the standing waves as they are being formed. The drive signal in line 111, which may be a voltage signal v(t) from the signal generation unit 110, may take the form of Equation 1 below in some embodiments:

$$V(t)=A\sin(\omega t+\theta(t))\qquad\text{Eqn. 1}$$

Where:
A is the amplitude of the drive signal (Volts),
$\omega$ is the drive signal frequency (in Hz),
t is the time (in seconds), and
$\theta$ is the phase angle (in degrees).

Initially, the drive signal in 111 may be a pure sinusoidal signal and the phase angle $\theta$ may be zero, so that the drive signal V(t) signal takes the form of equation 2 below:

$$V(t)=A\sin(\omega t)\qquad\text{Eqn. 2}$$

As the standing waves 432 become fully formed as shown in FIG. 4B (e.g., illustrating vertically-oriented standing waves), then the drive signal V (t) in line 111 may be phase modulated. However, the phase modulation may not need to wait until the standing waves 432 are fully developed, and may start when they are undeveloped or only partially developed in some embodiments. Phase modulating the drive signal in line 111 operates to move the standing waves back and forth in the direction shown by mixing directional arrow 444 approximately in proportion to the amount of phase change ($\Delta$ phase angle) that has been imparted to the drive signal in line 111. The phase angle may be changed by a $\Delta$ phase angle of from about 0 degrees to about 180 degrees, for example. Other $\Delta$ phase angles may be used.

Figure 3A:
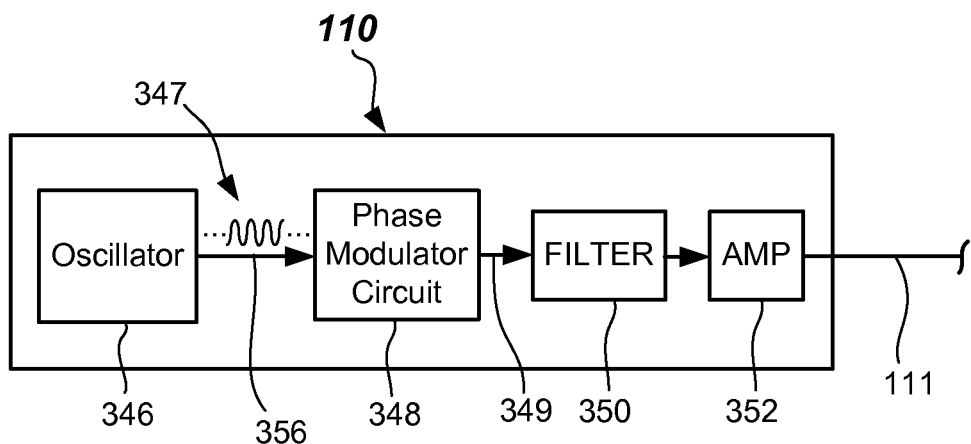
FIG. 3A illustrates a block diagram view of a signal generation unit configured to produce a phase modulatable drive signal according to embodiments.
Figure 3B:
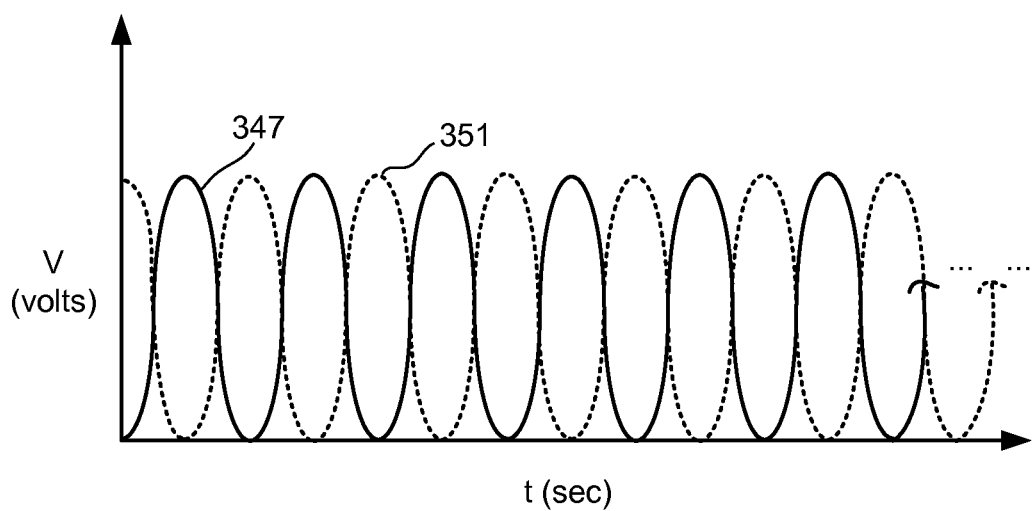
FIG. 3B illustrates a graphical view of an input to, and drive signal from, a signal generation unit configured to produce a phase modulatable drive signal according to embodiments.

As shown in FIG. 3A, one embodiment of the signal generator unit 110 may include an oscillator 346. The oscillator 346 may generate a sinusoidal wave 347, as is shown in FIG. 3B. The sinusoidal wave 347 may have a frequency as discussed above, for example. The oscillator 346 may be a harmonic or linear type oscillator (examples of are a Colpitts oscillator, Hartley, Armstrong oscillator (also known as a Meissner oscillator), Clapp oscillator, and a Wien bridge oscillator. The oscillator 346 may be adjustable in amplitude A, in some embodiments.

Signal generator unit 110 may include a phase modulator circuit 348 that receives the sinusoidal wave 347 at the desired frequency ($\omega$) and adjusts the phase angle $\theta$ thereof, such as according to Equation 1. This results in a phase shifted signal 351 (shown dotted in FIG. 3B). In one or more embodiments, the phase modulator circuit 348 may rapidly change the phase angle $\theta$, e.g., impulsively. For example, the phase angle may be modulated between a first phase angle and a second phase angle at a modulation frequency. Modulation frequency may be greater than about 1 Hz, and between about 1 Hz and about 50 Hz (between about 1 S to about 20 mS between phase shifts), or even between about 5 Hz and about 20 Hz (between about 200 mS and about 50 mS between phase shifts), in some embodiments. In one or more embodiments, the signal output in output line 349 may be filtered by a filter 350. Filter 350 may be a suitable low pass filter. For example, the cutoff frequency of the filter 350 may be set greater than or equal to the desired drive frequency ($\omega$) of the oscillator 346. Depending upon the strength of the signal exiting the phase modulator circuit 348, the signal in output line 349 may need amplified by an amplifier 352. Any suitable amplifier may be used, such as a class A, B or D class amplifier. The amplified signal is the drive signal in line 111 that drives the transducer 108 to cause standing waves to be generated within the reaction vessel 107.

Figure 3C:
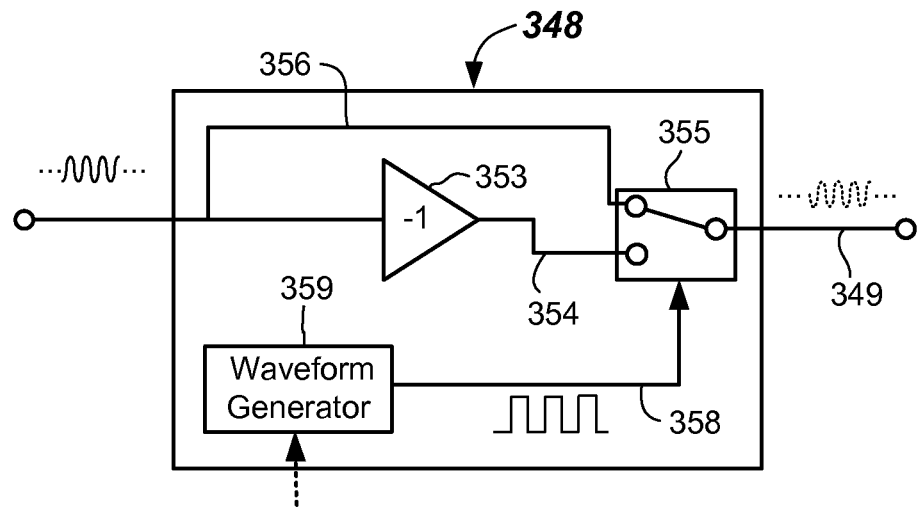
FIG. 3C illustrates a block diagram view of a phase modulator circuit according to embodiments.

FIG. 3C illustrates a first embodiment of a phase modulator circuit 348. In the depicted embodiment, a combination of an operational amplifier 353 and an analog multiplexor 355 may be used to provide a phase modulated drive signal. The operational amplifier 353 may operate as an inverter, multiplying the input signal by −1, and thus phase shifting the signal by 180 degrees in second line 354. The analog multiplexor 355 may be used to modulate between a first signal (e.g., a sine wave) received directly from the oscillator 346 (FIG. 3A) in first line 356, and a second phase shifted signal in a second line 354. The analog multiplexor 355 may be switched by any suitable means. For example, the analog multiplexor 355 may be switched in time in accordance with a modulation signal 358 from a waveform generator 359. The waveform generator 359 may be a 555 timer configured in an Astable mode, for example. Switching between the first and second lines 356, 354 may be based upon a square wave signal, for example, generated by the waveform generator 359. The modulation frequency of the waveform generator may be selected, set or provided as described above. Other suitable variants may be used.

Figure 3D:
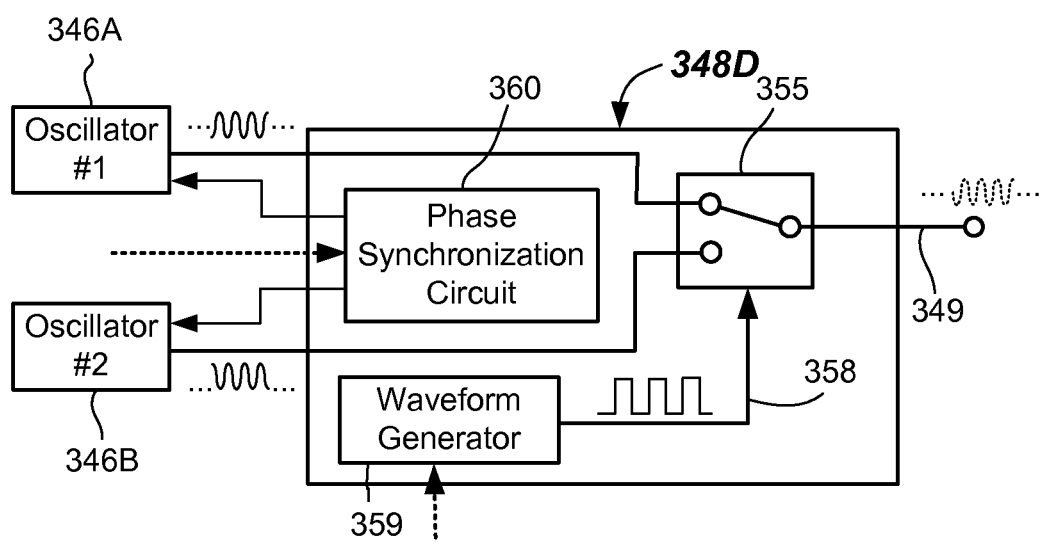
FIG. 3D illustrates a block diagram view of another phase modulator circuit according to embodiments.

In another embodiment, as is shown in FIG. 3D, a phase modulator circuit 348D that receives inputs from multiple oscillators 346A, 346B are provided. Oscillator #1 346A may generate a first wave (e.g., a sine wave), whereas oscillator #2 346B may generate a second wave that is out of phase with the first wave (as shown in FIG. 3B). In some embodiments, the second wave is 180 degrees out of phase with the first wave. Other phase differences are possible. A phase synchronization circuit 360 may be included to set and/or maintain a desired phase difference. Phase synchronization circuit 360 may be a phase-locked loop in some embodiments. As before, a switching component, such as an analog multiplexor 355 may be used to switch between the inputs from oscillator #1 and oscillator #2. Similarly, the rate of switching may be controlled by a modulation signal from the waveform generator 359. By switching between the inputs from oscillator #1 and oscillator #2, the signal in output line 349 may be phase modulated.

Figure 3E:
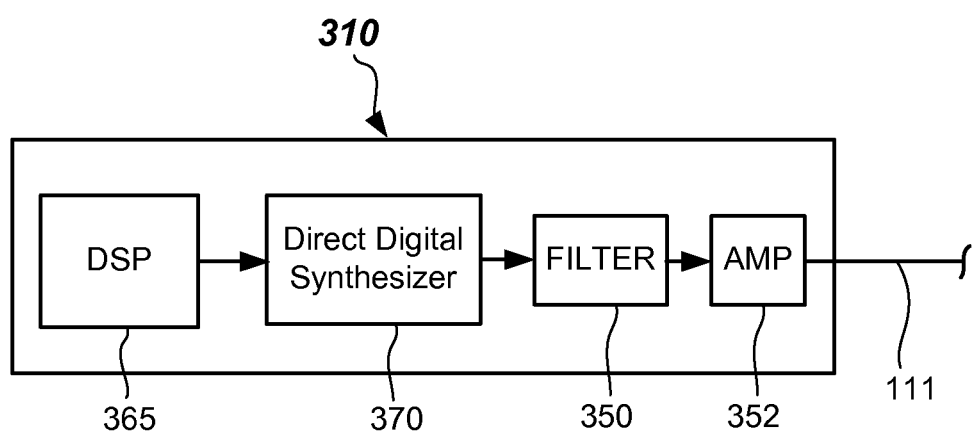
FIG. 3E illustrates a block diagram view of digital implementation of a signal generation unit according to embodiments.

In other embodiments, the a signal generation unit 310 that is configured to provide a phase modulatable drive signal to the transducer 108 to produce moving standing waves 432 (FIG. 4B) may be implemented entirely digitally. For example, as shown in FIG. 3E, the signal generation unit 310 may include a digital signal processor (DSP) 365 that communicates with a direct digital synthesizer 370. Communication may be by any suitable communication protocol, such as SPI, I²c, or the like. The DSP 365 may provide the operating frequency ω and the modulating frequency to the direct digital synthesizer 370. An AD9833 chip from Analog Devices may be used, for example. A programmable waveform generator may be used in place of the direct digital synthesizer 370 in some embodiments. Other suitable all-digital implementations of the signal generation unit may be used.

Figure 5:
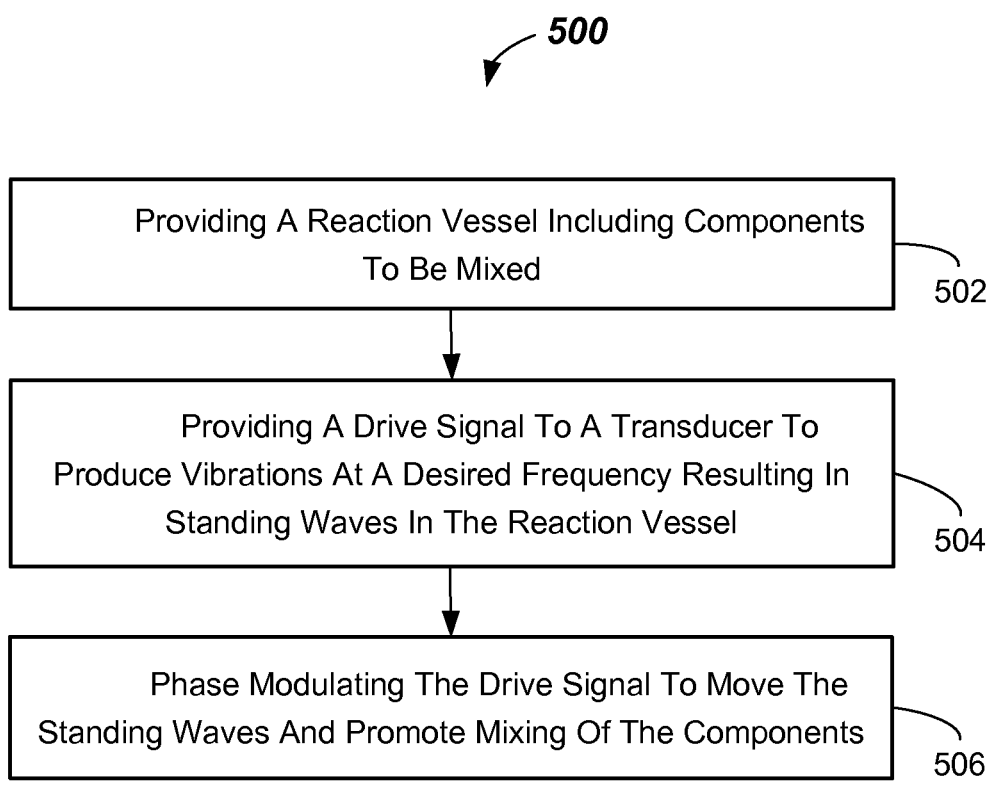
FIG. 5 illustrates a flowchart illustrating a method of mixing components according to embodiments.

FIG. 5 illustrates a method of mixing components (e.g., patient sample 109 and reagent 112), such as in a reaction vessel (e.g., reaction vessel 107) in a clinical analyzer apparatus (e.g., clinical analyzer apparatus 200). The method 500 includes providing a reaction vessel (e.g., reaction vessel 107) including components to be mixed (e.g., patient sample 109 and reagent 112) in 502.

The method 500 further includes, in 504, providing a drive signal (e.g., in line 111) to a transducer (e.g., transducer 108) to produce vibrations at a desired frequency (e.g., at frequency ω) resulting in standing waves (e.g., standing waves 432) in the reaction vessel.

The method 500 includes, in 506, phase modulating the drive signal to move the standing waves and promote mixing of the components. Phase modulation may be accomplished using one or more oscillators (e.g., oscillator 346, 346A, 346B) and a phase modulator circuit (e.g., phase modulator circuit 348, 348D)).

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A sonic mixing apparatus, comprising:
   a reservoir configured to contain a coupling liquid;
   a transducer configured to be driven at a frequency and communicate with the coupling liquid; and
   a signal generation unit configured to provide a phase modulatable drive signal to the transducer operable to produce standing waves that are moveable back and forth in the coupling liquid.

2. The sonic mixing apparatus of claim 1, further comprising a reaction vessel suspended in the reservoir from a carrier member.

3. The sonic mixing apparatus of claim 1, wherein the reservoir comprises an annular recess.

4. The sonic mixing apparatus of claim 1, wherein the signal generation unit is configured to be driven at approximately a resonant frequency of the transducer.

5. The sonic mixing apparatus of claim 1, wherein the signal generation unit comprises one or more oscillator.

6. The sonic mixing apparatus of claim 1, wherein the signal generation unit is configured to modulate a phase of the phase modulatable drive signal between a first phase angle and a second phase angle which is different than the first phase angle.

7. The sonic mixing apparatus of claim 1, wherein the signal generation unit includes an oscillator configured to be operable at between about 200 KHz and about 4 MHz.

8. The sonic mixing apparatus of claim 1, wherein the signal generation unit is configured to adjust a phase of the phase modulatable drive signal between about 0 degrees and about 180 degrees.

9. The sonic mixing apparatus of claim 1, wherein the signal generation unit comprises a phase modulator circuit including a wave generator configured to produce a phase modulation signal.

10. The sonic mixing apparatus of claim 9, wherein the phase modulator circuit comprises an analog multiplexor.

11. The sonic mixing apparatus of claim 1, wherein the signal generation unit comprises a low pass filter.

12. The sonic mixing apparatus of claim 1, wherein components to be mixed are patient sample and reagent.

13. The sonic mixing apparatus of claim 1, included within an analyzer apparatus.

14. A method of mixing components, comprising:
    providing a reaction vessel including the components to be mixed;
    providing a drive signal to a transducer to produce vibrations at a desired frequency resulting in standing waves in the reaction vessel; and
    phase modulating the drive signal to move the standing waves back and forth and promote mixing of the components.

15. The method of claim 14, comprising suspending the reaction vessel from a carrier member in a reservoir containing a coupling liquid.

16. The method of claim 14, comprising wherein the drive signal is between about 200 KHz and about 4 MHz.

17. The method of claim 14, wherein the phase modulating includes modulating between a first phase angle and a second phase angle.

18. The method of claim 17, wherein the modulation between the first phase angle and the second phase angle cycling takes place at a modulation frequency of between about 1 Hz and about 50 Hz.

19. The method of claim 14, wherein the components to be mixed are patient sample and reagent.

20. An analyzer apparatus, comprising:
    an annular reservoir configured to contain a coupling liquid;
    a transducer configured to be driven at a frequency and communicate with the coupling liquid;
    a carrier member configured to suspend reaction vessels containing components to be mixed in the coupling liquid; and
    a signal generation unit configured to provide a phase modulatable drive signal to the transducer to produce moving standing waves that are moveable back and forth in the components to be mixed in at least one of the reaction vessels.

* * * * *